United States Patent Office 2,786,011
Patented Mar. 19, 1957

2,786,011
STABLE CONCENTRATED AQUEOUS DISPERSION OF PESTICIDES AND THE LIKE

Leo J. Novak, Dayton, Ohio, assignor to The Commonwealth Engineering Company of Ohio, Dayton, Ohio, a corporation of Ohio No Drawing. Application June 18, 1954,
Serial No. 437,890

1 Claim. (Cl. 167—42)

This invention relates to compositions for use in the control of plant pests and plant diseases. More particularly, it relates to concentrated dispersions or suspensions which may be reduced with water prior to use.

It is desirable, obviously, for a manufacturer to prepare and ship compositions for use in controlling pests or treating plant diseases in a highly concentrated form, and let the consumer add sufficient water to the concentrate to reduce it to the concentration of the active essential ingredient desired for application to the plant or soil. Shipment of compositions comprising a high concentration of the active essential ingredient and a relatively small amount of water saves shipping expense for the manufacturer and this, in turn, may be passed on to the consumer.

Considerable difficulty has been experienced in preparing homogeneous sprayable compositions by the addition of water to compositions comprising a high concentration of solid, water-insoluble active pesticides, plant hormones and like ingredients in water for the reason that most of the dispensing or suspending aids available for use in preparing the concentrates do not effectively maintain the water-insoluble particles of the active ingredient in the dispersed or suspended condition. The particles tend to settle or "cake" at the bottom of the container in which the concentrate is packaged, and it is difficult to re-disperse the particles in the water added for diluting the composition to the desired concentration of the active ingredient. Those dispersing agents which may improve the stability of the initial highly concentrated dispersion generally must be used in a comparatively large amount.

One of the objects of the present invention is to produce highly concentrated, stable dispersions of solid, particulate pest controlling and plant treating agents.

Another object is to provide stable highly concentrated dispersions of this type containing a very small amount of a highly effective dispersing agent.

A further object is to provide stable, highly concentrated dispersions of the active agent which can be reduced with water to obtain stable, sprayable homogeneous dispersions.

These, and other objects and advantages which will appear hereinafter, are accomplished by dispersing the particulate active agent in water containing, as the dispersing aid, a very small amount of carboxymethyl dextran, which, in accordance with the invention, has been found to be an extremely effective dispersing agent for the present purpose.

The production of carboxymethyl dextran is described in the pending application of Leo J. Novak et al., Serial No. 346,016, filed March 31, 1953. In brief, the selected dextran and a carboxymethylating agent are reacted together in an aqueous alkaline medium whereby the carboxymethyl group is substituted for one or more hydroxyl groups in the dextran molecule. Suitable carboxymethylating agents are chloracetic acid, sodium chloracetate or chloracetamide. The reaction is carried out in an aqueous solution of a strong alkali metal hydroxide such as sodium, potassium or lithium hydroxide. Preferably, the dextran is treated, in aqueous solution or suspension, with an excess of sodium or potassium chloracetate in the presence of an excess of sodium or potassium hydroxide at a temperature of 50° C. to 100° C. for a time ranging from about 10 minutes to two hours. Preferably, also, the molar ratio of sodium chloracetate or potassium chloracetate to dextran is between 2:1 and 12:1, the molar ratio of sodium or potassium hydroxide to dextran is between 5:1 and 15:1, and the molar ratio of the water to dextran is between 70:1 and 120:1. The carboxymethyl dextran obtained has a D. S. (degree of substitution or average number of carboxymethyl groups per anhydroglucopyranosidic unit) of less than 1:1 to 3:1.

The reaction results in a viscous mass comprising the sodium or potassium salt of the carboxymethyl dextran. This viscous mass comprising the salt of the ether may be precipitated from the crude reaction mass by a non-solvent for the salt, as by means of any water-miscible alcohol, e. g., methyl, ethyl, propyl, isopropyl or t-butyl, or by means of any other organic, water-miscible solvent which does not dissolve the salt, such as, for instance, acetone.

The free carboxymethyl dextran may be recovered from the salt by mixing the latter with water, acidifying to a pH of about 2.0, and precipitating the ether by means of acetone or a water-miscible alcohol as specified above. The pH of 2.0 is not critical and other acid pH values may be used. However, the highest yields of the free ether have been obtained by precipitation at pH 2.0.

The dextran which is carboxymethylated may be obtained in various ways. It is usually biosynthesized from sucrose by inoculating an aqueous sucrose-bearing nutrient medium with a culture of a dextran-producing microorganism, such as those of the *Leuconostoc mesenteroides* or *L. dextranicum* types, or the enzyme isolated from the culture, and holding the mass until the dextran is produced in maximum yield. Microorganisms which may be used include those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139.

The "native" dextran present in the fermentate may be isolated by precipitation using a water-miscible aliphatic alcohol or ketone, purified, and reduced to fine powder form for carboxymethylation. This "native" dextran biosynthesized under the conventional conditions is normally characterized by a very high molecular weight, calculated to be in the millions. In preparing carboxymethyl ethers for use as dispersing agent in the compositions of this invention, the native dextran of very high molecular weight may be used or, prior to carboxymethylation thereof, it may be partially hydrolyzed to lower molecular weight dextran. Also, biosynthesis of the dextran may be conducted from the sucrose under special, controlled conditions such that the resulting dextran has a molecular weight lower than that of the dextran produced under the conventional conditions. That dextran may also be used. In general, the dextran carboxymethylated to obtain the dispersing aid may have a molecular weight of 5000 to $150 \times 10^6$, determined by light scattering measurements. However, the presently preferred carboxymethyl dextran for use as dispersing agent in these compositions is the ether derived from *Leuconostoc mesenteroides* B–512 native (unhydrolyzed) dextran (or from dextran equivalent to that native dextran) and containing an average of 2.0 to 3.0 carboxymethyl groups per anhydroglucopyranosidic unit. That carboxymethyl dextran is strikingly effective in stabilizing aqueous dispersions of the solid, particulate pest controlling and plant treating agents in extremely small concentrations. Amounts of the ether between 0.2% and 0.5% stabilize the dispersions most effectively and for indefinite periods of time.

The carboxymethyl dextran may be used to stabilize concentrated aqueous dispersions of all types of active plant-treating agents which are in solid particulate form. Such agents are variously designated as insecticides or pesticides, herbicides, fungicides, miticides, arachnicides, plant hormones, growth regulators, defoliants and so on. Specific agents which, in particulate form, may constitute the active or essential ingredient of the compositions include DDT [1,1-bis(p-chlorophenyl) 2,2,2-trichloroethane], phenothiazine, piperonyl butoxide, 3-(p-chlorophenyl)-1,1-dimethylurea, isopropyl-N-chlorophenyl carbonate, phenyl mercuric acetate, chloranil, various quinones and dithiocarbamates that are generally used as fungicides, copper salts of quinolinic acid and quinoline, 2′-1 chloroethyl-1-methyl-2-(p-butylphenoxy) ethyl sulfite; p-chlorophenyl-p-chlorbenzenesulfonate; octomethyl pyrophosphoramide, 0-[2-ethylmercapto]ethyl-0,0′-diethyl thiophosphate, and halophenyl esters of halobenzene sulfonic acid.

The concentrated dispersions of the invention may be prepared by simply adding an amount of the particulate active agent between 30% and 65% by weight of the total weight of the composition to water containing a small amount, such as between 0.1% and 0.5% by weight, of the carboxymethyl dextran and agitating the mixture until the active agent is uniformly dispersed. Or the active agent may be dispersed in the water with vigorous agitation and the carboxymethyl dextran added to the dispersion, the agitation being continued during such addition. The resulting product is characterized by high viscosity and may be, and generally is, a stable gel in which the particles of the active agent are maintained in a state of uniform dispersion in the aqueous phase.

The particle size of the active ingredient is not critical and very fine particles as well as particles of larger size may be effectively dispersed with the aid of the carboxymethyl dextran. Particles having a size ranging from 10 to 250 microns may be used.

The stabilized highly viscous dispersions or gels may be reduced with water, prior to use, to obtain dilute dispersions of comparatively low concentration with respect to the active ingredient without difficulty and by simply adding the desired amount of water to the gel with agitation.

The invention is illustrated by the following examples, in which the parts are by weight unless otherwise stated.

*Example I*

Forty parts of powdered (10 micron) 1,1-bis (p-chlorophenyl)-2,2,2-trichloroethane, 60 parts of water and 0.5 part of carboxymethyl dextran derived from B–512 native dextran and having a D. S. of 2.9, are introduced into a vessel equipped with an agitator, and thoroughly agitated for 2 minutes. The resulting highly viscous dispersion is fed into containers for shipment or storage.

*Example II*

Fifty parts of powdered phenothiazine, 49.5 parts of water and 0.5 part of the carboxymethyl dextran of Example I are agitated together until a stable gel is formed. This gel may be packaged and shipped or stored.

Other particulate active agents of the kinds discussed hereinabove may be dispersed in the same manner as described in Examples I and II, amounts of the carboxymethyl dextran of from 0.1% to 1.0% but usually not higher than 0.5% being used to effect the dispersion. Dispersions may be prepared containing one or more of the following ingredients, in addition to or in place of DDT: chlorinated naphthalenes, benzene hexachloride, dichlorodiphenyl ethane, diparachlorophenyl methyl carbinol, trichloro-diphenyl ethane, difluoro diphenyl trichloroethane, pyrethrins, and rotenone or derris extracts.

If desired, a wetting agent may be included in the composition. Those wetting agents which are commonly used in conjunction with pest control and plant treating compositions may be used, such as non-ionic polyethylene glycol monoalkyl ethers and surfactants of the type of "Aerosol OT" (sodium sulfosuccinate ester of a long chain fatty alcohol) may be employed.

It may also be desirable to include preservatives which function to inhibit the growth of those microorganisms which tend to flourish in aqueous dispersions, such as aromatic carboxylic acids and chlorinated phenols and cresols. Sodium orthophenyl phenate is typical of the preservatives which may be used.

Instead of using carboxymethyl dextran as such, the salts resulting from neutralization of the carboxy groups with alkaline reagent, i. e., the fixed and volatile alkalies, to form sodium, potassium, ammonium and related amine salts of the ether may be used. Thus, the sodium or potassium salt formed as the initial product in the carboxymethylating process described herein may be used directly, without recovery of the free ether therefrom. However, the free ether is presently preferred.

In appropriate instances, the stable concentrated dispersions of the invention can be added to water-reducible or emulsion paints, to produce insecticidal points.

It has been observed that DDT and like pesticides exhibit toxicity to warm blooded animals when used in solutions in fatty oils, due to the assimilation of the DDT through the skin and mucous membranes when in solution in fatty solvents. The present compositions, being free of fatty solvents, avoid that problem since the active agents are substantially insoluble in water and only dispersed in the aqueous phase.

The concentrated dispersions or gels may be reduced with water to any appropriate concentration of the active ingredient. A final active ingredient concentration of 1% to 10% is generally useful, depending on the particular active ingredient and the purpose for which it is used. These water-reduced dispersions may be applied in any suitable way, to the soil, directly to plants, or in a room or other enclosed space. They may be sprayed or otherwise applied on painted surfaces.

Also, in appropriate instances, and depending on the active ingredient, the water-reduced dispersions may be applied directly to the skin as protectives against pest attack. Dispersions of suitable active ingredients may be used as a rinse or spray for clothing that is to be worn in infected and infested areas or stored, and animals can be dipped or sprayed in water-reduced dispersions of suitable active pest-controlling agents to rid them of ticks, lice, fleas, etc.

The dispersions containing the carboxymethyl dextran are stable to heat and may be stored safely in hot climates.

The outstanding advantage of the dispersions, additional to the stability thereof, is the small amount of carboxymethyl dextran required to disperse the particulate active ingredient and maintain the particles in the dispersed state so that settling out thereof during shipping or storage is prevented. This stability results from the pronounced viscosity changes in aqueous media brought about by extremely small amounts of the carboxymethyl dextran. In this respect, the carboxymethyl dextran, and particularly that derived from native unhydrolyzed dextran of high molecular weight, is much more effective than available carboxymethyl celluloses.

In order to increase the viscosity of an aqueous system to the same extent as it is increased by the addition of the carboxymethyl dextran, it is necessary to add about five times the amount of carboxymethyl cellulose. In addition, the pronounced increase in viscosity is obtained more rapidly with the smaller amount of carboxymethyl dextran than when the larger amount of carboxymethyl cellulose is used.

Various changes and modifications in details may be made in carrying out the invention without departing from the spirit and scope thereof and, therefore, it is to be understood that it is not intended to limit the invention except as defined in the appended claim.

What is claimed is:

Concentrated pesticidal compositions consisting essentially of water, an effective amount of a substantially water-insoluble, particulative, active pesticide dispersed in the water and, as dispersant for the pesticide and thickener for the composition, from about 0.1% to 1.0% by weight of a substance selected from the group consisting of carboxymethyl dextran containing an average of about 2.0–3.0 carboxymethyl groups per anhydroglucopyranosidic unit, and alkali metal salts of said carboxymethyl dextran.

References Cited in the file of this patent
UNITED STATES PATENTS

| | | |
|---|---|---|
| 2,609,368 | Gaver | Sept. 2, 1952 |
| 2,614,061 | Coash | Oct. 14, 1952 |

OTHER REFERENCES

Walton: "Manufacturing Chemist," August 1953, vol. 24, No. 8, p. 333.

Whistler et al.: "Polysaccharide Chemistry," Academic Press, New York, 1953, p. 380.